INVENTOR
PAUL NEUVILLE

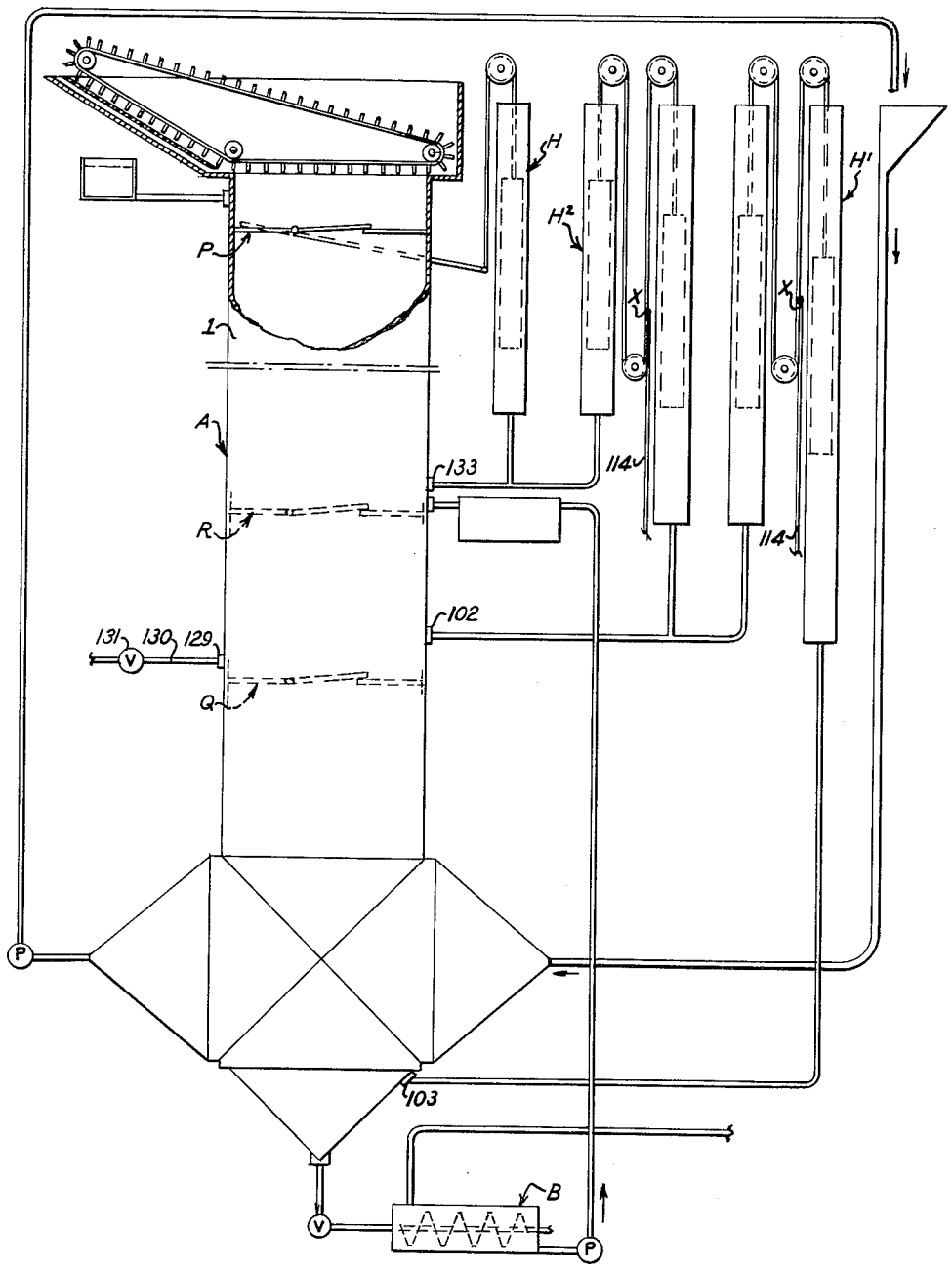

United States Patent Office 3,231,423
Patented Jan. 25, 1966

3,231,423
CONTINUOUS DIFFUSION OF BAGASSE
Paul Neuville, Rabastens, Tarn, France
Filed July 31, 1963, Ser. No. 298,829
13 Claims. (Cl. 127—7)

This application is a continuation-in-part of my prior application Ser. No. 787,971 dated January 20, 1959, and now abandoned.

The present invention relates to the continuous extraction of vegetable matter and, more particularly, of crushed cane or bagasse by diffusion.

The conventional process of extracting sugar cane juice from cane includes crushing the cane several times in succession and at the same time washing or lixiviating the bagasse thus obtained between two crushing steps with water. The process further includes chemically treating the juices thus obtained in order to purify them, decanting the juices and filtering the decanting sludges. Apparatus for this process requires a substantial investment such as for cane cutters, cane shredders or fiber removers, mills, decanters and filters with all their accessories. This process also requires a great expenditure of effort. Moreover, the desugaring of bagasse is comparatively ineffective in relation to the effort made since the water used for washing or extracting must not be hot and must be of relatively small quantity. Finally, the losses of sugar due to impairment are considerable and never negligible due to the difficulties of a good septic treatment. In fact, the losses of sugar in matter retained in filtered decanting sludges of the chemically treated juices amount to about 1% and even more of the extracted sugar.

In diffusion processes, the bagasse is produced by one or two crushings of the cane only and the juices and the bagasse are aseptized by heating to an average temperature of 90° C. and over. The bagasse methodically treated in a closed vessel with lukewarm water releases its sugar more readily; the losses due to the sludges are avoided for the bagasse itself serves as filtering agent, and said sludges are systematically washed at the same time as the bagasse.

The diffusion process has been used for more than fifty years. In spite of its great advantages, however, it has not found wide acceptance, because it operates discontinuously and because it requires a substantial investment and plentiful and skilled labor. An object of the present invention is to overcome these disadvantages.

The invention is based on the principle that the bagasse, just as in the discontinuous process, must be well opened so as to be desugared readily and must be endowed with a great floatability in order to be able to traverse continuously from bottom to top, solely under the influence of its floatation, a vertical diffusion column through which the desugaring liquid passes in counterflow.

The density of fresh cane is approximately 1. The cane comprises fiber and juice having a density of about 1.5 and 1.08 respectively, plus some enclosed air which brings the density of the whole to about 1.

Sugar cane that has passed through only 1 or 2 appropriately operated sugar mills of conventional type, without the use of a shredder, gives up close to 70% of its juice and yields a bagasse composed of shorter or longer well opened pieces which may exceed 20 cm. in length and to 10 cm. in width. The resulting bagasse comprises about 95% of open cells. A large number of said cells from which the juice has been removed encloses air.

The following phenomenon will be noted with respect to said resulting bagasse produced without the use of a shredder: when immersed in water, it will float about 50% above the water supported by the remaining immersed half.

One kilogram of bagasse completely immersed in water displaces about 2 liters of water. Its density is thus about 0.5. By contrast, bagasse obtained with the use of a shredder practically does not float at all.

A shredder produced bagasse passed through a mill and immersed in water comprises in variable proportion, according to the work of the shredder, a more or less sizeable portion which settles at the bottom of the receptacle and another portion which floats slightly. Reference is made here and later to Table I.

This floatability phenomenon relating to bagasse produced by mills has made it possible to carry out the discontinuous diffusion of bagasse as described by Noel Deer in "Sugar Cane," 2nd ed., page 255, a process which is still being used today.

In this process, the bagasse charged into diffusers accumulates to form a floating layer ("mattress") which strikes against the upper gate or door of the diffuser and which leaves below said floating layer and above the lower discharge gate a space which is devoided of bagasse.

The desugaring liquid circulates through said diffusers from the top downwardly. The pressure drop of the liquid passing through the diffuser never exceeds 50 to 60 grams per $cm.^2$, i.e., the force of floatability of the bagasse layer, whatever the rate of flow of the circulation.

The thickness of said layer must be less than the depth of the diffusers so that the bagasse does not contact the perforated sheet or plate at the bottom of the diffuser— for when the bagasse contacts said perforated sheet, the holes of the latter will become clogged, and the circulation of the juice will be slowed down or even stopped altogether.

The foregoing fact limits the loading of the diffusers with bagasse. Moreover, owing to the flexibility of the bagasse, said charging is still 25% greater than that of cane chip diffusers.

Since the bagasse does not come into contact with the perforated sheet at the bottom of the diffuser, it leaves said sheet perfectly clean during the entire duration of the sugar season. If such were not the case, the present discontinuous diffusion would be impracticable.

All attempts at circulating from the bottom upwardly have failed; in this case, the bagasse of the above-described layer strikes against the perforated sheets of the diffuser top, thereby clogging its holes.

By contrast, as has already been stated, the bagasse obtain with the use of a shredder practically does not float at all; the shredder bagasse having passed through a mill and being immersed in water settles in part on the perforated sheet of the bottom of the diffuser. In both cases, the holes of the perforated sheets of the diffuser bottoms will be clogged.

Attempts to use bagasse, which has been passed through a shredder, in the present discontinuous diffusers have failed, since the juices were unable to circulate through the diffusers.

*Table I.—Physical aspect of mill bagasse*

| Nature of pieces | Average size | | Percent of bagasse |
| --- | --- | --- | --- |
| | Length | Width | |
| Closed large | Over 14 cm | Over 2 cm | 5.5 |
| Open large | 12 cm. and over | 2 cm. and over | 11.5 |
| Medium | 5 to 12 cm | Over 5 m./m | 75.5 |
| Small (fines) | Under 5 cm | Under 5 m./m | 7.5 |

*Physical aspect of shredder bagasse*

Pieces of variable sizes up to 15 cm. long and less than 5 mm. wide.

Only a part of the 7.5% small (fines) of mill bagasse has no buoyancy.

Shredder bagasse has the same buoyancy as the fines of mill bagasse.

For many years, the diffusion of cane chips ("cossettes") of a regular thickness of 3 mm. has been carried out in practice. The pressure drop of the liquid passing through said diffusers was proportional to the rate of flow; it was of the order of 250 gr. per sq. cm. for the normal rate of flow—instead of a maximum of 60 gr. in bagasse diffusion—althonugh the cane loads or charges of these diffusers were 25% lower than those of bagasse diffusers. This further confirms the floatation of the bagasse coming from the mills in the diffusers.

As further substantiation of the floatability of bagasse suitably produced by sugar cane mills, it will be noted that in a diffusion battery in operation, the opening of the upper gate of any diffuser, previously isolated from adjacent diffusers and put under atmospheric pressure, brings about, as soon as a partial opening of the gate is sufficiently wide, a brisk outflow of bagasse expelled from the diffuser by the Archimedean buoyancy exerted by the immersed and subjacent bagasse.

Theory and experience show that this floatability of the bagasse is kept fully intact, even if the bagasse is immersed under more than 10 meters of water.

The continuous diffusion process which will be described below is based on said floatability of the bagasse. It is important that this floatability remain unaffected by improper handling of the bagasse to be diffused or under diffusion, and this floatability will cause the bagasse to traverse, due to its own buoyancy, the entire height of a diffusion column, at the bottom of which it has been introduced.

The present invention relates, more particularly, to a continuous process of desugaring bagasse, endowed with a great floatability, by aqueous diffusion and in counterflow, said process being characterized in that it causes a desugaring liquid to circulate continuously, in at least one column by gravity from the top to the bottom, while the bagasse flows from the bottom to the top, due only to the fact that its density is less than that of the juice which washes it. The bagasse advances at a rate controlled by constrictions or controls capable of slowing down or accelerating at will its flow toward the top of the column and also of creating zones more or less densely filled with bagasse. Those portions of bagasse, the proportion of which is small and which has a higher density than the juice that washes them and which drop to the bottom of the column, are continuously taken up again and put back with the bagasse ascending in the column and are entrained by the same.

The process of the invention also comprises other features:

The bagasse produced for the diffusion has about 95% of its cells opened by mills and the 5% of whole or intact cells touch with their walls the desugaring liquid, the temperature of which is close to 100° C., which facilitates the diffusion of their sugar.

The bagasse is an excellent filter when it has been produced by mills, and the raw juices of the mills treated chemically or only their sludges resulting from decantation, as well as the bagasse particles which are heavier than the juices are fed into the column so that their insoluble materials are deposited on the rising bagasse and are entrained by same, after desugaring, outside the column.

The invention also relates to apparatus for desugaring the bagasse by continuous diffusion in accordance with the above process, said apparatus being particularly characterized in that it comprises in combination with a diffusion column provided with a lower inlet orifice for the bagasse to be diffused and an upper outlet orifice for the spent bagasse: a device for introducing the bagasse into the column without impairing its physical properties of floatability; a device in the lower portion of the column for withdrawing juice; a device for supplying desugaring water and maintaining the level of the liquid in the column at a constant height; a device for evacuating the spent bagasse and draining the same; devices at different levels to produce, within the column, zones packed with practically constant amounts of bagasse and other zones free from compact bagasse, and devices for withdrawing clarified and clear juices from the column.

Bagasse immersed at a great depth in a liquid which is denser than the bagasse floats above the surface of said liquid at a height proportional to the Archimedean buoyancy exerted on the immersed bagasse. Said floating bagasse is of such a density that it is difficult to handle. For this reason, a movable grate capable of slowing down or accelerating, at will, the rising of the bagasse in the column is installed below and close to the level of the liquid filling the column to contain the bagasse and to protect the bagasse having passed through the grate from the buoyancy of the bagasse immersed in the column. It will thus be possible to remove the floating bagasse upon its arrival at the surface of the liquid by means of known apparatus such as, for example, a scraping transporter, a bucket chain, by overflow or other such means.

At least one other grate is installed at a lower level of the column capable of creating another zone of compact bagasse and two zones free from compact bagasse, one of said latter zones being located above said zone of compact bagasse and the other being located below said zone of compact bagasse, thereby permitting of readily introducing juice or of withdrawing juice without entraining bagasse.

Other features of the apparatus are the following:

The bagasse to be diffused is introduced, in suspension in juice, at the bottom of the column by means of a pipe which opens at a level higher than that of the top of the column and which opens toward the bottom of the column by way of a wide diffuser. A centrifugal pump cannot be used, for it disintegrates the bagasse and causes a portion of the bagasse to lose all its floatability.

The substances which are heavier than the bathing liquid and fed into the column with the bagasse (especially the finely disintegrated bagasse particles) concentrate at the bottom of the column. Said heavy substances with a portion of the liquid in which they bathe are continuously extracted from the column and reintroduced into the column above a zone of compact bagasse.

Prior to being returned into the column, said heavy particles are advantageously mixed with all raw juices from the mills after their chemical treatment or with their decantation sludges only. In the first case, when all chemically treated raw juices from the mills are introduced into the column, the decantation plant may be eliminated by arranging the column in such a manner as to be able to withdraw therefrom clarified and clear juices, which makes it possible to eliminate the decantation plant.

The diffused bagasse withdrawn from the upper portion of the column is pressed in mills of known type and the pressed bagasse is burned or discharged. The slightly sugared waters obtained are discharged if their sugar content is considered negligible. However, they can be wholly or partially purified by a chemical treatment and a decantation, and the clear portion is then introduced into the column in a zone free of compact bagasse and suitable for their sugar content.

Other features and advantages will become apparent from the description which follows and which is illustrated in the accompanying drawing given merely by way of example and wherein:

FIGURE 3 shows a variation of FIG. 1.

Figures 1, 2:
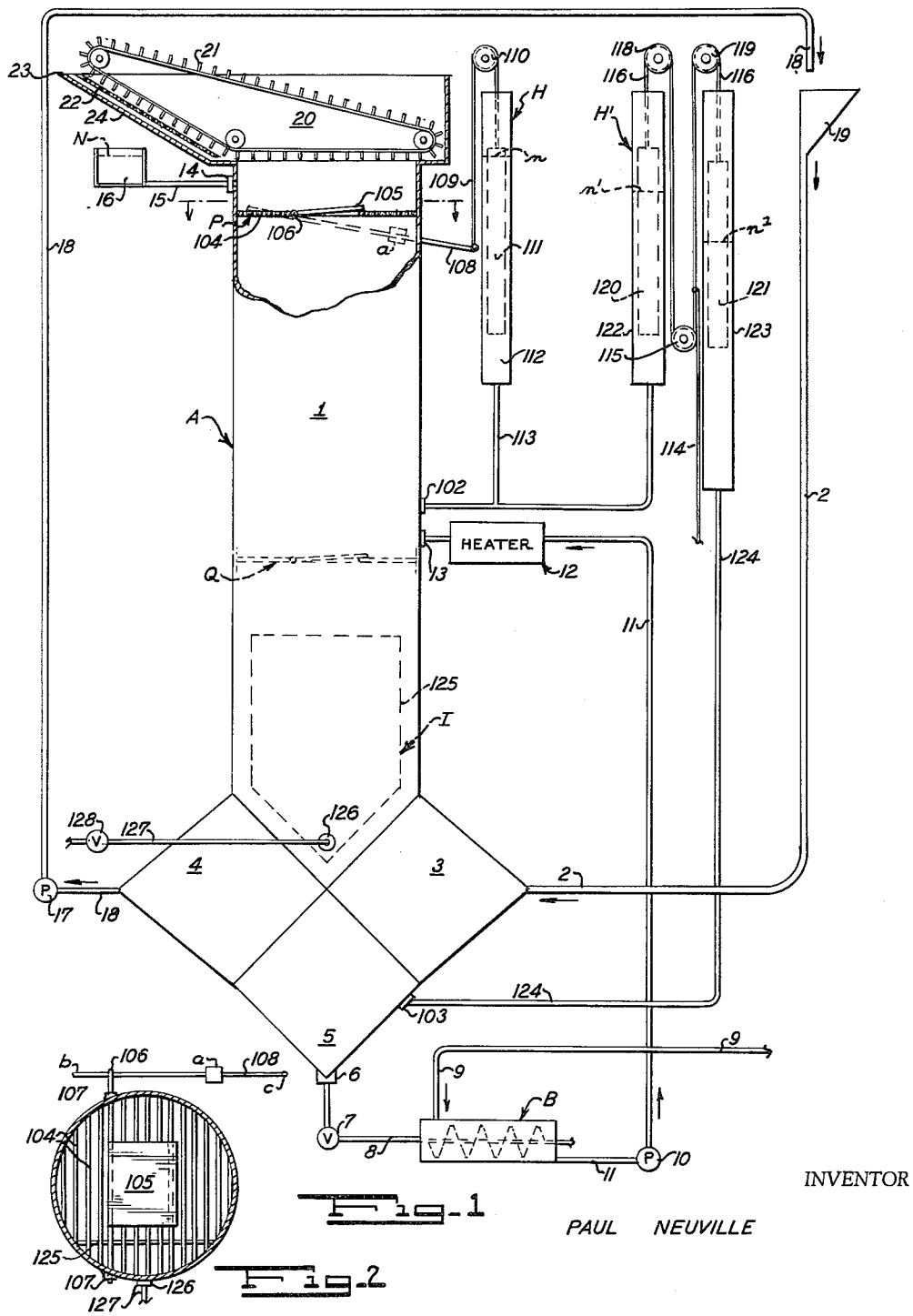
FIGURE 1 is a diagrammatic view of apparatus provided in accordance with the invention.
FIGURE 2 is a diagrammatic plan view, also by way of example, of a grate for controlling the rising of the bagasse in the associated column.

The arrows indicate the direction of flow of various products.

According to the embodiment shown in the drawing, the apparatus comprises a diffusion column A in combination with the following accessories: one or two cane crushing mills (not shown) which produce sugar cane juice on the one hand and bagasse on the other; a bagasse elevator (not shown) from the outlet of the mill to the upper portion 19 of a pipe 2 for introducing the bagasse into the column; a mixer B for mixing juice charged with heavy particles received from the bottom of the column with the cane juices (after their chemical treatment) or only with the sludges coming from a juice clarifying plant (not shown); an apparatus for the extraction of the diffused bagasse from the top of the column; one or several mills (not shown) for "repressing" the spent bagasse after it leaves the column A and producing a spent and drained bagasse and weak sugared liquors; apparatus H' for automatically controlling amounts of bagasse subjacent a grate; an apparatus I for withdrawing clear juice; and pumps and heaters.

Column A is composed of a preferably vertical cylinder 1 of any desired cross-section comprising different arrangements for introducing and extracting juice and bagasse, and controllable grates P and Q at different heights and to each of which there corresponds an automatic control apparatus H, H' to keep the amounts of bagasse retained by the grates constant.

The bagasse feed pipe opens at the hopper 19 above the level of the top of the column A; its descending portion 2 has a cross-section such that the velocity of descent of juice and bagasse in the said pipe is greater than the upward velocity of the bagasse in the juice; its outlet 3 into the column is a large diffuser so as to reduce turbulence and to start as rapidly as possible the concentration of the light bagasse and the heavy particles.

The lower end of the column 1 comprises, in addition to the divergent member 3 connecting the bagasse feed pipe 2 to the column, a convergent member 4 opposite said divergent member 3; a conical bottom 5 connected to valve or plug 7 by the coupling 6.

The coupling 14 and the conduit or pipe 15 connect the top of the column to the constant-level tank 16.

The couplings 102 and 103 located respectively at the portions of column 1 subjacent each grate connect the column to the automatic devices H and H' for controlling the amounts of bagasse that have accumulated under said devices.

The upper portion of the column 1 comprises a widening 20 compatible with the presence of a device for extracting spent bagasse floating at the surface of the liquid of the column. In FIG. 1 said device consists of a scraper chain or scraping transporter 21 which entrains the bagasse on an inclined plane 22 to the overflow 23, the bagasse floating above the upper level N of the liquid of the column. The inclined plane 22 is formed of a perforated metal sheet located on a double bottom 24 permitting the draining of the bagasse and the automatic return of the drained waters into the column.

Through the coupling 6 and the valve 7, the mixer B directly receives the juices charged with insoluble and dense materials which are decanted at the bottom of the column, and, through the conduit or pipe 9, the chemically treated cane juices or only the decantation sludges from the purifying plant.

The pump 10 sucks up the mixture from the mixer B and forces it through the conduit 11 and through the heater 12 into the column by way of the coupling 13.

The pump 17 directly sucks up the juices of the column 1 by the convergent member 4 and forces them through the conduit 18 into the hopper opening 19 of the bagasse feed or supply pipe.

The apparatus comprises at least two throttling devices or grates P and Q. These devices are impermeable to bagasse, but are permeable to liquids. In FIG. 1 they are fixed to the column 1 and form a plane or curved surface which occupies the entire cross-section of the column. Each of these surfaces has at least one opening which is more or less obstructed by a movable stopper which leaves a larger or smaller passage for the rising bagasse.

Automatic devices H and H' corresponding respectively to the devices P and Q keep the amount of bagasse accumulated under each grate constant by acting on a movable stopper of the opening of said grate.

In the case of the example described in FIGS. 1 and 2, the throttling device or grate is formed of parallel bars 104 fixed to the walls of column 1 in a horizontal plane and rather close to each other to retain the bagasse below them and to allow the juices to circulate freely.

The stopper of the opening of the grate is constituted by a solid gate or door permeable to liquids, but impermeable to the bagasse; said gate is integral with a horizontal shaft 106 about which it rotates and which traverses the column 1 through two packing glands 107 which form bushing or bearing. Said closed gate rests on an edge or rim of the grate and can pivot only above the opening.

The lever 108 is fixed on the shaft 106 outside the column (FIG. 2). Said lever 108 comprises a counterweight $a$ sliding therealong from $b$ to $c$. The center of gravity of the aggregate, lever and counterweight are always located on the same side as the gate with respect to the vertical plane passing through the shaft 106.

One point of the lever—end $c$ in the case of FIG. 1— is connected, by the cable 109 and the pulley or reducing drum 110, to a float 111 located in the tube or gage 112 which, through the conduit 113 and the coupling 102, communicates with the interior of the column. The cable, while being tight, is regulated so as not to exert any traction in either direction, when the gate 105 rests on the grate 104, and so that the liquid in tube 112 is at the same level N fixed for the column.

It will be noted that the gate 105 is able to rise by pivoting about the shaft 106 due to the action of sufficient pressure or thrust or buoyancy being exerted from the bottom to the top on the gate or door itself or due to the action of a traction exerted on the end $c$ of the lever 108 by the cable 109 following a sufficient drop of the level of the liquid in the tube 112 which thus releases the float 111.

An accumulation of bagasse below the upper grate P will next be considered.

When no liquid passes through said accumulation of bagasse, the level N in the column and the level $n$ in the tube 112 coincide.

The Archimedean buoyancy of the bagasse located below the gate 105 is exerted on the center of gravity of the surface of said gate.

The resultant of the weights of the gate 105, taking its immersion in account, and of the lever 108 with its counterweight *a* is exerted on the center of gravity of said weights.

If the Archimedean buoyancy counterbalances the resultant of said weights, taking into account the respective distance of said forces to the axis of rotation 106 of the gate, the gate is in equilibrium.

Any additional arrival of bagasse in the accumulated amount of bagasse increases the Archimedean buoyancy and opens the gate; an equilibrium is established between the opening of the gate and the arriving amounts of bagasse and keeps the amount of bagasse of the bagasse accumulation constant.

The displacement of the counterweight *a* along the lever 108 brings about a change of the distance of center of gravity from the aggregate of the gate, taking into account its immersion, and of the lever with its counterweight with respect to the axis of rotation of the gate and, consequently, of the value of the Archimedean buoyancy necessary for counterbalancing said aggregate of weights. It will thus be seen that the displacement of the counterweight *a* along the lever 108 regulates or controls the amount of bagasse of the bagasse accumulation retained by the grate P.

When the liquid passes through the accumulation of bagasse, the level $n$ of the liquid in the tube 112 drops to $n^1$, and the difference between the level N of the column and the level $n^1$ of the tube 112 measures the effective head or pressure of liquid above the accumulation of bagasse which causes same to be penetrated or traversed by the liquid.

The lowering of the level of the liquid in the tube 112 exposes the float 111, the effective weight of which thus increases and consequently exerts, by way of the cable 109 and the pulley 110, an upward (from bottom to top) traction on the lever 108.

The $Nn^1$ head of the liquid on the accumulation of bagasse counterbalances, to a greater or lesser degree, the Archimedean buoyancy of the bagasse on the gate and thereby decreases said buoyancy by the same amount.

For a certain accumulation of bagasse below the grate P, the traction exerted indirectly by the difference of level $Nn^1$ on the lever 108 added to the residual buoyancy on the gate counterbalances the aggregate of the weights of the gate 105 (its immersion being taken into account) and of the lever 108 with its counterweight, taking into account the distance of the force to the axis of rotation 106 of the gate.

Any additional arrival of bagasse in the accumulation of bagasse increases, on the one hand, the pressure or head required for the penetration of said accumulation by the liquid and, consequently, the upward traction on the lever 108, and, on the other hand, the residual Archimedean buoyancy. The gate, therefore, opens. It will be observed that an equilibrium is established between the opening of the gate and the arrivals of bagasse in the bagasse accumulation and that the equilibrium is kept constant.

By appropriate selection of the cross-section of the float and the point at which the cable 109 is applied against the lever 108, the accumulation of bagasse below the gate P will remain constant, regardless of the amount of liquid which passes through said accumulation of bagasse.

The constancy of said accumulation of bagasse is thus obtained automatically, whatever the working of the column.

When the accumulation of bagasse is located below the grate Q, the automatic action is obtained identically by causing a traction corresponding to the drop in pressure of the liquid passing through said accumulation to act on the lever 108 of the gate 105 of the grate Q. Said pressure drop is measured by the difference of the levels $n^1$ and $n^2$ of the liquids in the two tubes 122 and 123 respectively which are in communication with the column 1 through the couplings 102 and 103 located, respectively, above the grate Q and below the accumulation of bagasse retained by said grate Q.

Said traction is obtained by two identical floats 120 and 121 located, respectively, in the tubes 122 and 123, the three fixed pulleys 115, 118 and 119, the cable 116 which connects the two floats 120 and 121 by enclosing said three pulleys and the cable 114 firmly connected by one end of the cable 116 to the point X and by its other end to the lever 108 of the gate 105 (not shown in FIG. 1) of the grate Q.

When the column is in operation, the pressure drop of the liquid across the accumulation of bagasse below the grate P causes the level of the liquid in the two tubes 122 and 123 to drop by the same amount $Nn^1$; the identical floats 120 and 121 emerging by the same amount from outside the liquid counterbalance each other and do not cause any displacement of the cable 116.

The pressure drop of the liquid passing through the accumulation of bagasse below the grate Q causes the level of the liquid in tube 123 only to drop by the amount $n^1n^2$. The float 121 emerging from the liquid increases in actual weight and displaces the cable 116 so as to exert, by way of the cable 114, a traction on the lever 108 of the gate of the grate Q.

This method thus brings about the same solution of automatically keeping constant the amount of bagasse accumulated below the grate Q, whatever the operating rate of the column.

The action of the pressure drop caused by the liquid passing through an accumulation of bagasse on the stopper of the grate has been described above, by way of example, as being exerted through the intermediary of glass gages, floats, cable and levers.

Said action due to the pressure drop can also be exerted by other mechanical means or else by known electromagnetic, electric, pneumatic means or by a combination of these different means to which may be added, if desired, servo-motors and relays to amplify the displacements.

Clarified and clear juice can be withdrawn from the column 1 by installing a third grate R with its automatic device $H^2$ (FIG. 3) identical to the grates P and Q and their automatic devices H and $H^1$, above the accumulation of the grate Q and located below and close to the coupling 13 for introduction of hot juices charged with solid impurities to be filtered on bagasse. In this case, the zone free of compact bagasse located above the grate Q below the accumulation of bagasse retained by the grate R contains juice that has been filtered by said accumulation of bagasse. Said juice can be withdrawn as clear juice from outside the column by a pipe 130 having an opening or nozzle 129 in a portion of the zone free of compact bagasse.

The use of said third grate R lengthens the column.

Said grate may be avoided by separating the juices descending from the rising bagasse at a certain level in the accumulation of bagasse retained by the grate Q.

As a matter of fact, the hot juices passing from top to bottom through the grate Q and the subjacent accumulation of bagasse follow a path which may be divided into three sections: in a first section, the bagasse absorbs the insoluble impurities of the juice which thereby becomes progressively clarified; in the second section of said path the clarified and clear juice circulates through the rising bagasse; in the third section of said path, the rising bagasse which has just been introduced into the column is gradually freed from the free, impure and non-clarified juice, which is accompanied by the clear juice which passes through same coming from the top and arrives clean in the said second section.

Thus, in order to obtain a clarified and clear juice, it is merely necessary to withdraw the same from the column in the second section of said path.

For this purpose, one or more partitions are arranged vertically below the grate Q (a single partition 125 is shown in FIG. 1); the upper side thereof is horizontal and is located in the zone of the second path where the juice is clear; its other sides are connected in a fluid-tight manner to the wall of the column 1, thereby forming a sort of pocket which penetrates into the column 1 to the height of the feed pipe of the bagasse.

A coupling 126 at the bottom of said pocket followed by a conduit 127 and a stopper 128 permit withdrawing clarified and clear juices from the column.

The bagasse located on the right hand side of the pocket is renewed constantly by thermal circulation.

How continuous diffusion with production of clarified and clear juices operates in the apparatus illustrated by the diagram of FIG. 1 will next be described.

Cane mills produce juice, on the one hand, and bagasse on the other.

When the column A is filled with water up to at least the grate P and the pump 17 delivers, through the conduit 18, liquid withdrawn from the column by the convergent member 4 to the hopper 19, the bagasse is fed into said hopper 19. The liquid entrains the bagasse through the pipe 2 to the bottom of the column 1. The bagasse which is lighter than the bathing liquid moves upwardly through a zone which is practically free of bagasse and is then first retained by the grate Q which keeps below it a layer of bagasse of a certain thickness controlled or adjusted at will by the position of the counterweight $a$ of the lever 108 which is controlled by the cable 114 of the automatic device $H^1$.

While the bagasse is being accumulated below the grate Q, it is heated progressively by hot juice introduced through the coupling 13 into the column, and reaches its maximum temperature when arriving at the level of grate Q.

While the supply of bagasse from the bottom of the column continues, the bagasse under consideration then passes into the accumulation of bagasse retained by the grate P.

The automatic devices H and $H^1$ are so regulated as to obtain the greatest possible accumulations of bagasse below the grate, taking into account the necessity of maintaining zones free of compact bagasse to facilitate the introducing of juices and of bagasse and the withdrawals of juices.

The bagasse finally escapes from the grate P and arrives, as spent bagasse, in the trough (tray) 20 at the surface N of the liquid of the column, where it is removed immediately by the scraping transporter 21 onto the inclined plane 22 to the overflow 23.

An inclined plane, not shown in FIG. 1, then receives the bagasse and conveys same to the drying mills to make it combustible.

Eventually the draining waters from said mills are purified, heated and returned into the column.

Moreover, the juices follow the following circuit:

The water outflows from the column resulting from the withdrawn juices and the spent bagasse are much more sizeable than the water inflows into the column resulting from the reconstituted cane, owing to the arrival of crude juices through the pipe 9 and of bagasse through the feed pipe 2. In order to compensate for this fact, the upper portion of the column communicates permanently, through the coupling 14 and the conduit 15, with the constant-level water tank 16; in this manner, the level of the liquid in the column is kept constant.

The water introduced in this manner travels from the top of the column to its lower portion through the bagasse, thereby becoming enriched with sugar.

The crude juices produced by the cane crushing apparatus, which may or may not be mixed with the juice of the column, are treated chemically to be purified.

Said treated juices or simply their decanting sludges and the juice of the convergent member 5 comprising all solid materials decanted in the lower portion of the column are heated to 102° C. and fed into the column above the grate Q.

In the example of FIG. 1, the crude juices produced by the crushing apparatus are treated separately and are then sent through the conduit 9 into the mixer B where they mix with the juice coming from the stopper 7 and comprising all solid materials decanted into the convergent member 5.

The pump 10 sucks in said mixture and delivers it by the conduit 11 through the heater 12, which raises its temperature to 102° C., into the column 1 through the coupling 13.

Said juices then meet the juices arriving from the top of the column and originating from the water introduced through the coupling 14 and enriched with sugar by circulating through the bagasse. The combined juices pass through the bagasse accumulated below the grate Q, and their solid impurities are absorbed by the bagasse.

A portion of said juice is separated by the partition 125 of the device I within the accumulation of the bagasse and is withdrawn from the column through the coupling 126, the conduit 127, and the valve 128.

Said juices which have been filtered on the bagasse and which are not polluted in any way, are clarified and clear and are delivered to the concentration plant by a pump which is not shown in FIG. 1.

The other portion of said juices passes through the entire arriving bagasse and continues to heat the latter while doing so. Said juices displace all free and impure juices, which accompany the bagasse, towards the bottom of the column. The resulting juice mixture finally enters the mixer B and returns into the column 1, heated and clarified, until the time when it is evacuated through the device I and fed to the concentration plant.

Finally, the operation of the plant when in use consists in:

Watching that the pumps 10 and 17 operate;

Supervising that the heater 12 delivers juice at the right temperature;

Regulating the stopper 7 so that the mixer B does not overflow and that the amount of juices passing through the heater 12 is sufficient to obtain the most efficient temperature in the bottom of the column; said control may be automatic or may be carried out manually;

regulating the counterweights $a$ of the levers 108 for controlling the gates of the grates P and Q in order to keep the maximum of bagasse below said grates as compatible with the other operational requirements;

Regulating the stopper 128 for withdrawing juice from the column according to the sugar content fixed for said juice taking into account the strength (sugar concentration) of the cane; said control may be automatic or may be carried out manually.

The device I for withdrawing clear juice may be omitted; in this case, the juices will be withdrawn from the bottom of the column and will be treated chemically with the crude juices originating from the mills, and these combined juices will be decanted so as to obtain, on the one hand, clear juices suited for concentration and, on the other hand, the decanting sludges which will be fed to the mixer B, whence they will be introduced into the column so as to deposit therein their solid impurities on the bagasse.

What is claimed is:

1. An apparatus for the aqueous extraction of sugar from bagasse, said apparatus comprising a vertical column, means for supplying bagasse to the bottom part of the column and means for supplying desugaring liquid to the top of the column, said vertical column including, at intervals, throttling means allowing free passage to said liquid but adapted for retaining the bagasse which rises in the column due to its buoyancy, in layers of controllable thickness separated by zones devoid of compact bagasse, and in the zones free of compact bagasse means for the introduction of various juices and water, and other means for the withdrawal of various juices, said apparatus further comprising means for extracting spent bagasse from said column; said throttling means each comprising a grate for retaining the rising bagasse connected to the column and provided with at least one opening and a gate having a horizontal axis about which it pivots and controlling the passage of the bagasse through said opening, and means controlling said gate and actuated by the buoyancy of the bagasse subjacent said gate, and automatic means for keeping constant the amount of bagasse accumulated below each throttling means, each automatic means comprising a lever coupled to one of said gates and located outside the column and including thereon a sliding counterweight, a gage outside the column, a pipe connecting the gage to said column, a float in said gage, and a cable connecting said lever and float.

2. An apparatus as claimed in claim 1 comprising a means for introducing bagasse at the lower portion of the column and comprising a pipe and a feed hopper connected to said pipe at a level higher than that of liquid in said column, a diffuser connecting the pipe to the lower portion of the column, a pump which sucks in juice at the lower portion of the column and which delivers said juice into said feed hopper, and means to supply the bagasse to be diffused to said hopper.

3. An apparatus as claimed in claim 1 wherein the means for extracting spent bagasse extracts the same at the surface of the liquid in the column and comprises above the upper of the throttling means means continuously collecting bagasse arriving at the surface of the liquid and adapted for transporting the same outside of the column.

4. An apparatus as claimed in claim 1 comprising, in a zone free of compact bagasse and located in a lower portion of the column, a convergent member wherein there are concentrated materials which are insoluble and denser than the juices, and a valve coupled to said member end adapted for evacuating outside the column liquid charged with said insoluble and dense materials.

5. An apparatus as claimed in claim 4 comprising means for heating, within the column, bagasse retained by said throttling means and for causing said bagasse to absorb all precipitates of chemical purification of the liquids and the insoluble materials and materials denser than the liquids, at least one mixer to which are fed said liquids charged with precipitates of the chemical purification and charged with said materials, and a pump delivering said liquids through a heater into the column in a zone free of compact bagasse and located above the latter said throttling means.

6. An apparatus as claimed in claim 5 comprising means for keeping the level of liquid of the column constant and for maintaining the temperature realized by the heating of the bagasse within the column by introducing hot water at the top of the column into a zone free of compact bagasse.

7. An apparatus as claimed in claim 1 wherein the extraction is effected from a starting product comprising, on the one hand, said bagasse having many cells emptied of their juices and, hence, endowed with great floatability, and, on the other hand, a crushing juice which has been subjected to a chemical clarifying treatment, said apparatus comprising means for continuously withdrawing from the column a clarified and clear sugary liquid, and including a fluid-tight vertical partition located below the last constriction and at a predetermined level connected at the walls of the cylinder at a level close to the orifice for introducing fresh material to be desugared so as to form an upwardly open fluid-tight pocket where the material to be desugared and the liquid can penetrate only from the top; and an outlet pipe at the lowermost portion of said pocket for withdrawing liquids outside the cylinder, and a stopper in the outlet pipe which regulates withdrawal of the liquid.

8. An apparatus as claimed in claim 7 comprising an outlet pipe on the column provided with a plug and is located above the lowermost constriction in the column for the final withdrawal of clear sugary liquid from the column.

9. A continuous diffusion process for the continuous extraction of sugar from sugar cane, comprising taking a bagasse of sugar cane, namely material composed of pieces of crushed sugar cane having cells from which sugar juices have been expelled and which contain occluded gas so that the bagasse has high buoyancy, feeding said bagasse by feeding means which avoid compressing the bagasse to the extent of expelling said occluded gas, to the bottom of a diffusion column in suspension in a continuously flowing sugar juice acting as a vehicle entraining the bagasse, supplying desugaring liquid to the top of the column at a rate insuring that the level of the desugaring liquid in the column is constant, the desugaring liquid flowing downwardly through the column in counterflow to the bagasse which travels upwardly in the column solely on account of its buoyancy, regulating the rate of upward travel of the bagasse by throttling to a variable extent the cross-sectional area of the column in a plurality of vertically spaced transverse planes of the column, a top one of said planes being in close vicinity to and subjacent said level of the desugaring liquid, the throttling being effected in each of said planes by means of a barrier which is permeable to the desugaring liquid and impermeable to the bagasse and has a throughway opening of variable cross-sectional area, the bagasse accumulating under each barrier in the form of a layer of compact bagasse of given thickness, said throttling comprising varying the cross-sectional area of said openings in such manner that said given thicknesses each remain substantially constant regardless of variations in the upward travel of the bagasse through the column and in such manner that permanent zones, free of compact bagasse, are automatically created in the column immediately above said barriers and immediately above the bottom of the column, collecting the extracted sugar in the zone free of compact bagasse below the layer of compact bagasse immediately above the bottom of the column, and removing the bagasse which has risen to and floats on the surface of the desugaring liquid.

10. A continuous diffusion process for the continuous extraction of sugar from sugar cane, comprising taking a bagasse of sugar cane, namely material composed of pieces of crushed sugar cane having cells from which sugar juices have been expelled and which contain occluded gas so that the bagasse has high buoyancy, feeding said bagasse by feeding means which avoid compressing the begasse to the extent of expelling said occluded gas, to the bottom of a diffusion column in suspension in a continuously flowing sugar juice acting as a vehicle entraining the bagasse, supplying desugaring liquid to the top of the column at a rate insuring that the level of the desugaring liquid in the column is constant, the desugaring liquid flowing downwardly through the column in counterflow to the bagasse which travels upwardly in the column solely on account of its buoyancy, regulating the rate of upward travel of the bagasse by throttling to a variable extent the cross-sectional area of the column in a plurality of vertically spaced transverse planes of the column, a top one of said planes being in close vicinity to and subjacent said level of the desugaring liquid, the throttling being effected in each of said planes by means of a barrier which is permeable to the desugaring liquid and impermeable to the bagasse and has a throughway opening, and a valve element cooperating with said opening so as to form a passage of variable section for the bagasse, said valve element being responsive to the Archimedean thrust of the bagasse and to the pressure drop undergone by the desugaring liquid flowing downward through the bagasse subjacent the barrier and moving in a direction increasing the section of said passage with increase in the sum of the Archimedean thrust of the buoyant bagasse and said pressure drop of the desugaring liquid and vice versa, the bagasse accumulating under each barrier in the form of a layer of compact bagasse, arranging that the response of the valve elements to the thrust of the bagasse and to said pressure drop be such as to automatically allow through said variable section passages such amount of bagasse as to insure that the thicknesses of said layers of compact bagasse are each constant and such as to leave zones free of compact bagasse in the column immediately above the bottom of the column and immediately above the barriers, collecting the extracted sugar in the zone free of compact bagasse below the layer of compact bagasse immediately above the bottom of the column, and removing the bagasse which has risen to and floats on the surface of the desugaring liquid.

11. A continuous diffusion process for the continuous extraction of sugar from sugar cane, comprising supplying desugaring liquid to the top of a diffusion column at a rate insuring that the level of the desugaring liquid is constant during the extraction, taking a bagasse of sugar cane, namely material composed of pieces of crushed sugar cane having cells from which sugar juices have been expelled and which contain occluded gas so that the bagasse has high buoyancy, continuously gravity feeding said bagasse into the top of a feed pipe communicating with the bottom of the column and extending above said constant level of desugaring liquid while simultaneously continuously supplying sugar juice to the top of said feed pipe at a rate which entrains the bagasse through the feed pipe into the bottom of the column, the desugaring liquid flowing downwardly through the column in counterflow to the bagasse which travels upwardly in the column solely on account of its buoyancy, regulating the rate of upward travel of the bagasse by throttling to a variable extent the cross-sectional area of the column in a plurality of vertically spaced transverse planes of the column, a top one of said planes being in close vicinity to and subjacent said level of the desugaring liquid, the throttling being effected in each of said planes by means of a barrier which is permeable to the desugaring liquid and impermeable to the bagasse and has a throughway opening of variable cross-sectional area, the bagasse accumulating under each barrier in the form of a layer of compact bagasse of given thickness, said throttling comprising varying the cross-sectional area of said openings in such manner that said given thicknesses each remain substantially constant regardless of variations in the upward travel of the bagasse through the column and in such manner that permanent zones, free of compact bagasse, are created in the column immediately above said barriers and immediately above the bottom of the column, collecting the extracted sugar in the zone free of compact bagasse below the layer of compact bagasse immediately above the bottom of the column, and removing the bagasse which has risen to and floats on the surface of the desugaring liquid.

12. A continuous diffusion process for the continuous extraction of sugar from sugar cane, comprising taking a bagasse of sugar cane, namely material composed of pieces of crushed sugar cane having cells from which sugar juices have been expelled and which contain occluded gas so that the bagasse has high buoyancy, feeding said bagasse by feeding means which avoid compressing the bagasse to the extent of expelling said occluded gas, to the bottom of a diffusion column in suspension in a continuously flowing sugar juice acting as a vehicle entraining the bagasse, supplying desugaring liquid to the top of the column at a rate insuring that the level of the desugaring liquid in the column is constant, the desugaring liquid flowing downwardly through the column in counterflow to the bagasse which travels upwardly in the column solely on account of its buoyancy, regulating the rate of upward travel of the bagasse by throttling to a variable extent the cross-sectional area of the coulmn in a plurality of vertically spaced transverse planes of the column, a top one of said planes being in close vicinity to and subjacent said level of the desugaring liquid, the throttling being effected in each of said planes by means of a barrier which is permeable to the desugaring liquid and impermeable to the bagasse and has a throughway opening of variable cross-sectional area, the bagasse accumulating under each barrier in the form of a layer of compact bagasse of given thickness, said throttling comprising varying the cross-sectional area of said openings in such manner that said given thicknesses each remain substantially constant regardless of variations in the upward travel of the bagasse through the column and in such manner that permanent zones, free of compact bagasse, are created in the column immediately above said barriers and immediately above the bottom of the column, collecting the extracted sugar in the zone free of compact bagasse below the layer of compact bagasse immediately above the bottom of the column, and removing the bagasse which has risen to and floats on the surface of the desugaring liquid, the process further comprising withdrawing from the bottommost part of the column a liquid which comprises said desugaring liquid and sugar juices from the bagasse and dense unfloatable substances from the bagasse decanted in said withdrawn liquid and feeding the latter into a mixer, heating to the temperature of defecation said withdrawn liquid and feeding the heated withdrawn liquid and sugar juices previously obtained from crushing sugar cane and heated to the temperature of defecation into the column at a level of the column immediately adjacent one of said barriers, and extracting a part of the resultant liquid in the zone free of compact bagasse below the layer of compact bagasse accumulated under said one of said barriers whereby said part of the resultant liquid does not mix with and does not come in contact with fresh bagasse fed into the bottom of the column and is suitable for concentrating.

13. An apparatus for the aqueous extraction of sugar from bagasse, namely a starting material composed of pieces of crushed sugar cane having cells from which sugar juices have been expelled and which contain occluded air so that the bagasse has high buoyancy, said apparatus comprising a vertical diffusion column, means for supplying desugaring liquid to the top of the column, means for maintaining the level of the desugaring liquid constant in the column, means for feeding bagasse to the column consisting of a feed pipe extending downwardly from a level higher than said level of the desugaring liquid and connected at its lower end to the bottom part of the column and means for gravity feeding said bagasse and sugar juice into the top of said feed pipe so that the sugar juice entrains the bagasse along therewith, the desugaring liquid flowing downwardly through the column in countercurrent to the bagasse which travels upwardly from said bottom part of the column solely under the effect of its buoyancy, a plurality of variable throttling means in vertically spaced relation in the column for regulating the upward travel of the bagasse, each throttling means comprising a barrier extending transversely across the column and permeable to the liquid and impermeable to the bagasse and having an aperture and a movable valve element cooperating with the aperture to provide a throughway passage for the bagasse of variable cross-sectional area, the valve element being responsive to the upward thrust of the buoyant bagasse and increasing said cross-sectional area of the passage with increase in said thrust and vice versa, the size of said passages being such that the bagasse accumulates under the barriers in layers of compact bagasse of controllable thickness with zones free of compact bagasse in the column located immediately above each barrier and immediately above the bottom of the column, said feed pipe communicating with the column in the zone free of compact bagasse immediately above the bottom of the column, means modifying the response of said valve element to the thrust of the bagasse comprising means responsive to the pressure drop undergone by the desugaring liquid in passing through each barrier and the layer of compact bagasse thereunder operatively connected to the valve element corresponding to the barrier so as to tend to shift the valve element to increase said cross-sectional area of said passage when the pressure drop increases and vice-versa, means for collecting the extracted sugar with said liquid in one of said zones free of compact bagasse, means for supplying liquids containing sugar juices to one of said zones, means for drawing off the resultant liquids from the zone free of compact bagasse immediately below said one of said zones, and means for removing spent bagasse which has risen to the top of the column and floats on the surface of said liquid.

References Cited by the Examiner

UNITED STATES PATENTS

| | | | |
|---|---|---|---|
| 1,265,582 | 5/1918 | Adams | 127—55 X |
| 2,828,230 | 3/1958 | Heinrich | 127—7 |
| 2,853,405 | 9/1958 | Heinrich | 127—7 |
| 2,857,907 | 10/1958 | Kaether et al. | 127—7 |
| 2,927,007 | 3/1960 | Kaether | 127—7 X |

FOREIGN PATENTS

| | | |
|---|---|---|
| 569,482 | 2/1933 | Germany. |
| 1,498 | 5/1869 | Great Britain. |
| 410,730 | 9/1932 | Great Britain. |
| 258,849 | 6/1957 | Great Britain. |

MORRIS O. WOLK, *Primary Examiner.*